R. H. OBARR.
ROADWAY FOR VEHICLES.
APPLICATION FILED OCT. 18, 1913. RENEWED APR. 20, 1916.
1,193,918.
Patented Aug. 8, 1916.
2 SHEETS—SHEET 2.
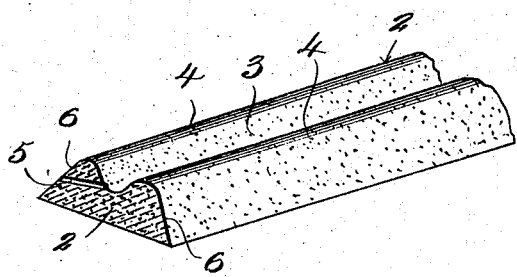
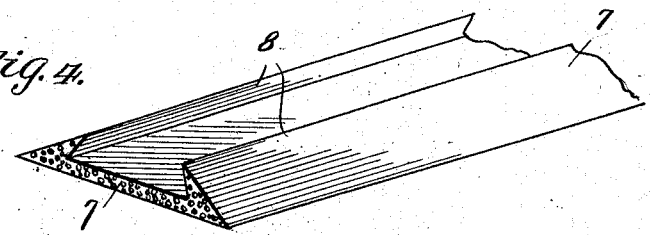
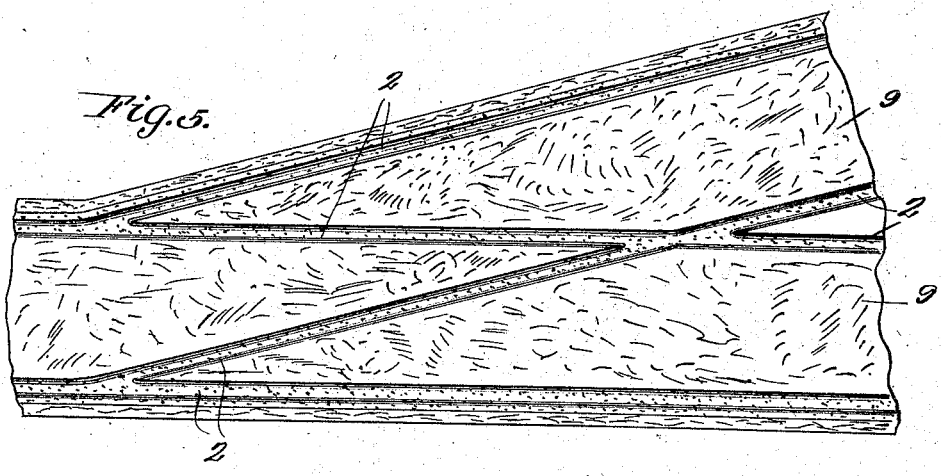

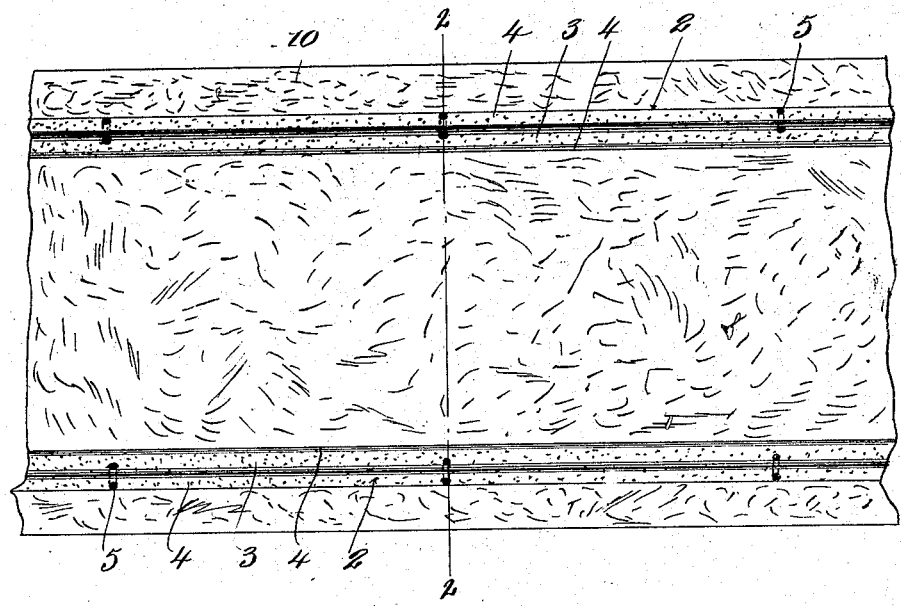
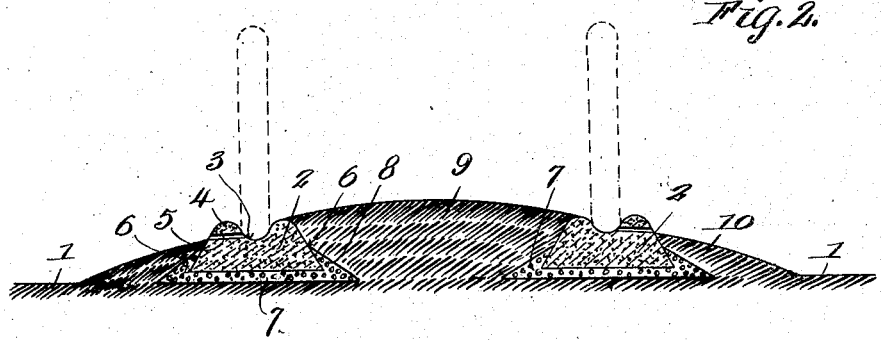

UNITED STATES PATENT OFFICE.

RICHARD H. OBARR, OF HARPER, TEXAS.

ROADWAY FOR VEHICLES.

1,193,918.  Specification of Letters Patent.  Patented Aug. 8, 1916.

Application filed October 18, 1913, Serial No. 796,012. Renewed April 20, 1916. Serial No. 92,533.

*To all whom it may concern:*

Be it known that I, RICHARD H. OBARR, citizen of the United States, residing at Harper, in the county of Gillespie and State of Texas, have invented certain new and useful Improvements in Roadways for Vehicles, of which the following is a specification.

This invention relates to an improved road-way, and the object thereof is to provide road rails so arranged and embedded upon a highway as to provide substantially a pavement for automobiles, wagons, trucks and other two or four wheeled vehicles to travel upon, thus practically supplying a road pavement at the cost of laying parallel rails longitudinally of the road-way at a sufficient distance apart to carry the wheels within their tread. Features of this class of road-way that I claim to have covered in my construction shown by the drawings accompanying this specification include a road rail having sufficient width and design of tread to accommodate and receive the different gages of the wheels of vehicles ordinarily used upon public highways; a road rail provided with flanges upon each side of the tread thereof for the purpose of retaining and directing the wheels of vehicles upon the track; inclined surfaces approaching the flanges upon each side of the tread of the rail for the purpose of supporting and leading the wheels of the vehicle to and from the adjacent road-way surface and the track; a road rail provided with flanges for the retention of the wheel or vehicle, so located, designed and combined with the tread and inclined surfaces of the rail and with the adjacent road-way as to admit of the wheels of a vehicle readily mounting or leaving the rail of the track as desired; a road rail of such design, magnitude and weight that when embedded in the road-way will remain firm and stationary under the action of the wheels of a moving vehicle, and will support heavy loads; a road rail so constructed as to be readily and securely tamped and packed in a permanent position to give economy of maintenance and support heavy loads and provide easy and rapid transit thereover; a road rail so constructed as to be readily maintained in true alinement; a road rail that can be molded and made of suitable weight, dimension and shape to conform to the usual requirement of the same as well as to provide for curves, angles, corners, switches and the like; and finally a plastic road rail, the original cost and maintenance of which is small in comparison with the metallic rails heretofore employed for this purpose.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1 is a top plan view of a road-way constructed in accordance with the present invention; Fig. 2 is a section on the line 2—2 of Fig. 1; Fig. 3 is a detail perspective view of a portion of one of the plastic rails embodied in the present invention; Fig. 4 is a detail perspective view of a plastic rail chair employed for the purpose of supporting the plastic rails; and Fig. 5 is a top plan view illustrating the switch arrangement in use where a single pair of longitudinally extending rails are employed.

Referring now to the drawings wherein is illustrated the preferred embodiment of my invention the numeral 1 designates the level of the earth or ground upon which the roadway comprising the present invention is to be built. Sufficiently spaced, and disposed to extend in parallel relation, I provide a pair of plastic rails, designated in their entirety by the numeral 2. The tread of each rail 2 is provided with a longitudinally extending groove 3 of suitable size and of a configuration to conform with the outline of the vehicle wheel adapted to travel thereupon. By the provision of the groove 3, it is apparent that ridges or flanges 4 are formed upon each side of the rail 2, the same providing a retaining element whereby the wheels of the vehicle traveling over the road-way are maintained against lateral or side-wise movement and within the groove 3 provided therefor. An inclined conduit or opening 5 is formed within the outer flange 4 of the rail at intervals throughout its length to form a means whereby proper drainage of the said rails may be effected.

The side walls 6 of the rail 2 are tapered as shown, thereby providing a rail base, the width of which is comparatively larger than the tread portion of the said rail. By tapering or diverging, in cross section, the lateral faces of walls of the rails, it is apparent that a locking means is provided therefor when associated with a plastic rail chair designated as an entirety by the numeral 7, to be hereinafter fully described. The said chair 7 is preferably composed of cement and other plastic compositions to form a bed extending longitudinally throughout the length of the rail 2, the said chair having integrally formed upwardly and inwardly projecting flanges 8 so disposed with respect to the rail 2 as to overlap the lateral faces thereof as is illustrated to advantage in Fig. 2 of the drawings. The arrangement of the rail 2 within the chair 7 provided therefor, both being embedded in the road-way, provides a positive retaining element or securing means whereby the said rails are maintained in parallel spaced relation and incapable of spreading.

Between the rails 2 a filling 9 of any suitable material is provided, the said filling serving to maintain the said rails incapable of relative inward lateral movement, as well as providing means whereby the vehicle traveling thereover may, if desired, leave the rails and travel upon the road-way adjacent thereto. Upon the outside of the rail 2 a filling 10 is provided the same being inclined from the level of the ground to a point upon the same plane as the outlet 5 aforesaid. This arrangement of the filling 10 provides for the passage of the vehicle from and to the rail 2, at the same time providing a cover or inclosure for the chair 7 arranged therebeneath.

In construction, the plastic material of which the rails and chair 7 are composed, is molded, preferably in sections, of any desired length, the same being then positioned in parallel spaced relation and the fillings 9 and 10 then arranged.

Particular attention is called to the fact that the original cost as well as the cost of maintenance and repair, should the latter be necessary, is reduced to a minimum, and that the many objectionable features now manifest wherein metallic rails are employed are completely overcome, as rusting, expansion, spreading, as well as upkeep are either completely obviated or materially reduced.

Referring now particularly to Fig. 5 of the drawings, branch or switch rails have been provided, the same being adapted for use wherein but a single track or road-way is employed, thus permitting the passing of vehicles traveling in an opposite direction, or if necessary, in the same direction, without one of the vehicles leaving the track.

From the above, taken in connection with the accompanying drawings, it will be noted that the grooves 3 of the rails 2 provide a guide for the wheels of the vehicle traveling thereover, the flanges 4 serving to maintain the said wheels within the groove while the peculiar formation of the rail tread tends to reduce the wear upon the vehicle wheels or tires to the minimum; that a road-way of the character described is particularly desirable in arid or unsettled countries wherein the cost of building and maintaining a highway is of such magnitude as to render its construction impracticable; and that the longevity of a road-way construction in the manner above set forth is of such duration as to be almost permanent in its nature.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

A vehicle track including a plastic rail having a longitudinal groove formed therein, the mentioned groove in cross section conforming approximately to the configuration of a vehicle tire, the extensions formed by and at each side of said groove being provided with rounded bearing surfaces, each of the said extensions terminating upon the same horizontal plane, the respective lateral faces of the rail being formed at an angle to the vertical and diverging toward the rail base, the said rail being provided with a drain opening leading outwardly from the groove for the purpose specified, and a plastic rail chair having a longitudinal dove-tailed groove formed therein within which the rail is seated, the engagement of the chair with the rail providing for the retention of the latter, substantially as described.

In testimony whereof I affix my signature in presence of two witnesses.

RICHARD H. OBARR.

Witnesses:
OTTO RUHE,
WESLEY O. TAYLOR.